US010657692B2

(12) United States Patent
Delaney et al.

(10) Patent No.: US 10,657,692 B2
(45) Date of Patent: May 19, 2020

(54) DETERMINING IMAGE DESCRIPTION SPECIFICITY IN PRESENTING DIGITAL CONTENT

(71) Applicant: INTERNATIONAL BUSINESS MACHINES CORPORATION, Armonk, NY (US)

(72) Inventors: Mark Delaney, Raleigh, NC (US); Trudy L. Hewitt, Cary, NC (US); Shadi Albouyeh, Raleigh, NC (US); Brett Ward, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/058,503

(22) Filed: Aug. 8, 2018

(65) Prior Publication Data
US 2020/0051296 A1 Feb. 13, 2020

(51) Int. Cl.
G06T 11/60 (2006.01)
G10L 13/04 (2013.01)
G06K 9/00 (2006.01)
G06F 40/30 (2020.01)

(52) U.S. Cl.
CPC .............. G06T 11/60 (2013.01); G06F 40/30 (2020.01); G06K 9/00469 (2013.01); G10L 13/043 (2013.01)

(58) Field of Classification Search
CPC . G06T 11/60; G06F 17/2785; G06K 9/00469; G10L 13/043
See application file for complete search history.

(56) References Cited

U.S. PATENT DOCUMENTS

| 8,566,102 | B1 | 10/2013 | Bangalore et al. | |
| 2007/0168413 | A1* | 7/2007 | Barletta | G06F 3/04883 709/203 |
| 2014/0082466 | A1* | 3/2014 | Heo | G06F 17/24 715/202 |
| 2014/0114643 | A1* | 4/2014 | Baker | G06F 17/241 704/9 |
| 2014/0146053 | A1 | 5/2014 | Cragun et al. | |

(Continued)

OTHER PUBLICATIONS

"Alternative Text", [retrieved on Jul. 20, 2018]. Retrieved from the Internet URL: <https://webaim.org/techniques/alttext/>, WebAIM | Web Accessibility in Mind, pp. 1-14.
(Continued)

Primary Examiner — Mandrita Brahmachari
(74) Attorney, Agent, or Firm — Tihon Poltavets; Matthew M. Hulihan; Heslin Rothenberg Farley & Mesiti PC

(57) ABSTRACT

Image description specificity determination is provided by a method that obtains digital content to be presented on a device to a user. The digital content includes a digital image, of which a description is to be provided to the user, and text. The method further analyzes the digital content and ascertains a context under which the description of the digital image is to be provided to the user. The method determines, based at least in part on the context, a level of specificity for describing the digital image to the user. The method presents the digital content, including the digital image, to the user in accordance with the determined level of specificity for describing the digital image.

17 Claims, 7 Drawing Sheets

(56) References Cited

U.S. PATENT DOCUMENTS

| | | | |
|---|---|---|---|
| 2016/0042230 A1 | 2/2016 | Conboy et al. | |
| 2017/0132498 A1* | 5/2017 | Cohen | G06F 17/2785 |
| 2017/0132821 A1* | 5/2017 | Valliani | G06F 17/241 |
| 2017/0269816 A1 | 9/2017 | Bradley et al. | |
| 2017/0270123 A1* | 9/2017 | Jhamtani | G06F 17/2785 |
| 2017/0337220 A1* | 11/2017 | Metz | G06K 9/6201 |
| 2017/0371856 A1* | 12/2017 | Can | G06F 17/2881 |
| 2018/0143980 A1* | 5/2018 | Tanikella | G06Q 50/01 |
| 2018/0293440 A1* | 10/2018 | Kikin Gil | G06K 9/00684 |
| 2018/0373979 A1* | 12/2018 | Wang | G06K 9/00664 |

OTHER PUBLICATIONS

Ge, S., "Automatic Image and Video Tagging", 2015, Retrieved on Aug. 8, 2018 from the Internet URL: <https://web.archive.org/web/20170314225235/http://scottge.net/2015/06/30/automatic-image-and-video-tagging/> (12 pgs.).

Yingwei, Pan et al., "Jointly Modeling Embedding and Translation to Bridge Video and Language", [retrieved on Jul. 20, 2018]. Retrieved from the Internet URL: <https://arxiv.org/pdf/1505.01861v3.pdf>, Jun. 4, 2015, 10 pgs.

Sergio Guadarrama, et al., "YouTube2Text: Recognizing and Describing Arbitrary Activities Using Semantic Hierarchies and Zero-shot Recognition", [retrieved on Jul. 20, 2018]. Retrieved from the Internet URL: <https://www.cs.utexas.edu/~vsub/pdf/YouTube2Text_Recognizing_and_2013_ICCV_paper.pdf>, ICCV 2013, pp. 2712-2719.

Wikipedia, "Levenshtein distance", [retrieved on Jul. 20, 2018]. Retrieved from the Internet URL: <https://en.wikipedia.org/wiki/Levenshtein_distance>, 7 pgs.

Newton, C., "Facebook begins using artificial intelligence to describe photos to blind users", [retrieved on Jul. 20, 2018]. Retrieved from the Internet URL: <https://www.theverge.com/2016/4/5/11364914/facebook-automatic-alt-tags-blind-visually-impared>, Apr. 5, 2016, 6 pgs.

"Image Descriptions", [retrieved on Jul. 20, 2018]. Retrieved from the Internet URL: <https://soap.stanford.edu/tips-and-tools/tips/image-descriptions>, Stanford Online Accessibility Program, 3 pgs.

"How to Make Your Blog Accessible to Blind Readers", [retrieved on Jul. 20, 2018]. Retrieved from the Internet URL: <http://www.afb.org/info/programs-and-services/technology-evaluation/creating-accessible-websites/how-to-make-your-blog-accessible/1235#alt>, American Foundation for the Blind, 5 pgs.

Mell, Peter, et al., "The NIST Definition of Cloud Computing", NIST Special Publication 800-145, Sep. 2011, Gaithersburg, MD, 7 pgs.

\* cited by examiner

DETERMINING IMAGE DESCRIPTION SPECIFICITY IN PRESENTING DIGITAL CONTENT

BACKGROUND

Screen readers are software programs that assist individuals, such as sight-impaired individuals, to 'read' and understand information that is displayed to them on the computer screen. Screen reader applications convey information by converting text and other elements of digital content displayed on the screen to an audible version that can be heard by the user. Often times this is done using a speech synthesizer. Other types of screen reader applications convert the content to a tactile version for conveyance via a Braille display. When an image or other graphical content (photos, tables, charts, etc.) are displayed on the screen, they are typically described using image recognition and natural language applications.

SUMMARY

Shortcomings of the prior art are overcome and additional advantages are provided through the provision of a computer-implemented method. The method obtains digital content to be presented on a device to a user. The digital content includes a digital image, of which a description is to be provided to the user, and text. The method analyzes the digital content and ascertains a context under which the description of the digital image is to be provided to the user. The method determines, based at least in part on the context, a level of specificity for describing the digital image to the user. The method also presents the digital content, including the digital image, to the user in accordance with the determined level of specificity for describing the digital image.

Further, a computer program product including a computer readable storage medium readable by a processing circuit and storing instructions for execution by the processing circuit is provided for performing a method. The method obtains digital content to be presented on a device to a user. The digital content includes a digital image, of which a description is to be provided to the user, and text. The method analyzes the digital content and ascertains a context under which the description of the digital image is to be provided to the user. The method determines, based at least in part on the context, a level of specificity for describing the digital image to the user. The method also presents the digital content, including the digital image, to the user in accordance with the determined level of specificity for describing the digital image.

Yet further, a computer system is provided that includes a memory and a processor in communication with the memory. The computer system is configured to perform a method. The method obtains digital content to be presented on a device to a user. The digital content includes a digital image, of which a description is to be provided to the user, and text. The method analyzes the digital content and ascertains a context under which the description of the digital image is to be provided to the user. The method determines, based at least in part on the context, a level of specificity for describing the digital image to the user. The method also presents the digital content, including the digital image, to the user in accordance with the determined level of specificity for describing the digital image.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
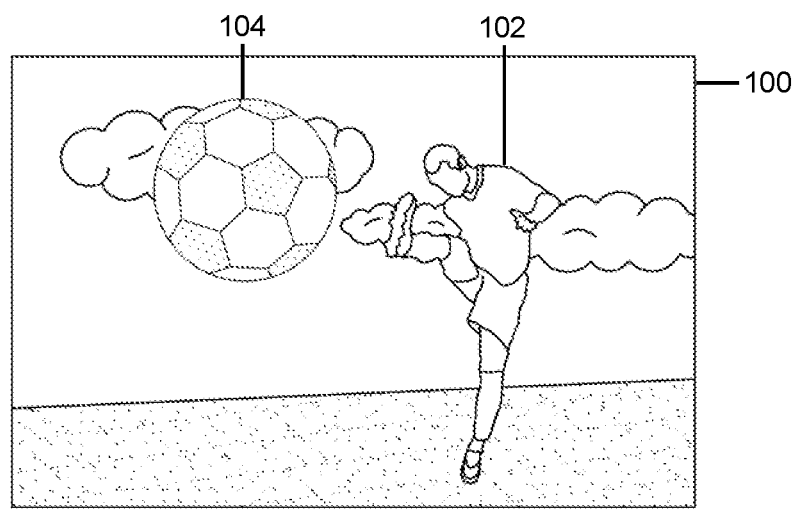
FIG. 1 depicts an example digital image, included in digital content, and of which a description is to be provided to a user.

Currently there are no means of determining a level of specificity for describing a digital image as part of a screen reader application. Existing approaches for screen reading digital images often result in confusing or redundant descriptions and, ultimately, a less-than-ideal user experience. Additionally, aspects described herein differ from approaches focused on determining what words are used by screen readers to describe a given graphic/photo without consideration for where to insert the description of the image or altering the descriptive text to ensure that the description is consistent, desired, and flows well given the context of what is being read.

Described herein are aspects that intelligently determine a level of specificity for a screen reader application to use in describing digital images (also referred to as "media" herein). Specificity could be measured by any appropriate marker(s), for instance the number, detail and/or definition of the words, phrases and/or sentences used, as examples.

Some conventional screen readers describe media by leveraging image analysis to generate a natural language description. Digital content, such as documents, web pages, messages, etc. are to be presented on a user device to the user. The digital content might include both text and digital image(s). Text is typically read out loud, and a description of the digital image(s) is also to be provided to the user. However, there are no means of determining the level of specificity of such a description.

Approaches described provide for intelligently integrating digital graphical images/elements (photos, charts, etc.) into the context of surrounding text to improve user comprehension and overall flow for screen readers. This is done in part by tailoring the level of specificity used in describing a displayed digital image, for instance based on surrounding context, which can inform whether and what makes sense to describe with respect to the image, for instance whether a description makes sense, adds value, is redundant, and other considerations. A screen reader could evaluate the context in which the digital image is presented and ascertain what to recite and where to recite the description, based on what makes the most sense in the context of the surrounding text being read. Accordingly, a process can obtain and analyze the digital content, and ascertain a context under which the description of the digital image is to be provided to the user. Based on that context, the process can determine a level of specificity for describing the digital image to the user.

The actual positioning of the image description in the overall description (e.g. 'reading') of the digital content can be significant, as conventional approaches sometimes describe images at awkward positions in the audio stream. In this regard, aspects described herein can also determine placement for the description of the digital image in the audio description of the digital content. Determining this placement can be based on any of various considerations, for instance similarities of the description of the digital image to other portions of the digital content. If the image sits between text that is not the most appropriate to surround a description of the image in the audio description, then placement, in the audio description, of the description of the digital image relative to the presentation of the other portions of the digital content can differ from the position of the digital image relative to those other portions in the digital content. In other words, the position at which the image is described when reading the content may differ from the position of the digital image in the document itself.

Levels of specificity and specificity ranges can be established, for instance by an administrator or other user, based on the level of descriptive detail used to describe an image, for instance (using an example where the digital image is a logo of a coffee brand): a 'Low Specificity' (e.g. <40%) might describe the image as "Coffee Brand Logo", a 'Medium Specificity' (e.g. 41-74%) might use the brand name in describing the image, e.g. "[brand name] Coffee Logo, Red Circle with animal in the center", and a 'High Specificity' (e.g. >75%) might describe the image as "[brand name] Coffee Logo is a 2" circle that has a drawing of a sea creature in the center in black in white, surrounded by a red circle, [brand name] written at the top, and 'coffee' written at the bottom. The sea creature is homage to the history of [brand name]'s home city of Portland."

The percentages used in the above example can be representative of any appropriate measure, for instance an interest projection of the user. In this regard, factors such as the user's interest and/or familiarity with the content, and whether a description of the image would add value to the overall context, may be determined. Analyzing the digital content can analyze an extent to which the image conveys information additional to what is provided by the text of the digital content, for instance. Additionally or alternatively, analyzing the digital content can analyze the user's interest in and/or familiarity with topics of the digital content, and the context can include a level of that user's interest in and/or familiarity with the topics. Depending on the desired factors, the process can produce an appropriate description, which would be any degree of specificity, or could be null, meaning any description of the image is to be omitted.

The example ranges above could represent thresholds that are set based on trial and error, or by learning appropriate values over time, as examples. They could be user-specific, user-tailorable and/or user set.

An example process presents the digital content, which includes the digital image, to the user in accordance with the determined level of specificity for describing the digital image. Presentation in this sense could include an audio description of the digital content. 'Description' encompasses a 'reading' of some or all of the content. Thus, presenting the digital content can include the user's device automatically reading, as part of an audio description of the digital content, at least some of the text of the digital content and the description of the digital image. It is also noted that presentation of the digital content could omit any description of the digital image that is a discrete description of the digital image (as opposed to portions of the text that might incidentally be describing aspects of the image). Thus, in some examples, it is determined to provide no separate description of the digital image when the level of specificity is determined to be so small or nonexistent.

Aspects improve the user experience in the comprehension of graphical elements with respect to specificity of the description, including expanding or narrowing the description to improve the user's understanding of the content. This may be particularly useful for users with visual impairments who rely primarily on screen readers for information.

In some aspects, a process considers whether the text already provided in the digital content (and therefore to be automatically read out loud for the user) is redundant in comparison with a proposed description of the digital image. If so, an indicator may be provided that there is a representative graphic when that text is read, but a description of the graphic may be omitted so that it is not redundant to the user. In some cases, there could be no description at all of the image. In other cases, a candidate description is substituted for another description. For instance, if user interest in the content is relatively high but a description (of the image) in the text is a generic description, the description in the text may be substituted for a more detailed description (and no separate description of the image provided, a less specific description of the image provided, or the same detailed description of the image provided). Additionally or alternatively, the text description may be omitted, and a description of the image at an appropriate place in the audio stream may be provided. In yet another example, portion(s) of the text are made less specific based on the description to use for the image being more specific. Thus, if the level of specificity to use for the description of the digital image is as specific or more specific than a portion of text of the digital content that describes the image but to a lesser degree of specificity, the presentation of the digital content can include, in lieu of reading the portion of text, reading a modified version of the portion of text, where the modified version of the portion of text is less specific than what the portion of text originally said. In other words, if the description to use for the image is relatively specific, then a sentence or other text portion, which may be equally as specific, can be modified to be less specific. As another example, even if a sentence in the text is already less specific than the image description, but still consumes an undesirable amount of time to dictate, the sentence could be made even less specific or omitted altogether, on account of the additional detail being provided when describing the image.

Aspects can additionally or alternatively consider, as examples:
 paragraphs and other text portions of the digital content, and their relation to the image, as an aggregate in ascertaining the context under which the description of the digital image is to be provided;
 strings of sentences (syntactic n-grams) with correlation to the subject image; and/or
 relevance of an image to the text and decide whether to include a description of the image at all, and/or perhaps wait to describe the image until the end of describing the remainder of the digital content.

Moving media, such as GIFs or videos, which are just collections of digital images, could have a single frame captured and used in ascertaining the context.

In some embodiments, image descriptions could be transformations of both the natural language understanding (NLU) image description and the most relevant text in the digital content, e.g. as a mashup. In other words, the image description that the device actually recites to the user could be a function/transformation of a description of the desired level of specificity and the most relevant text from the document.

As noted, consideration may be given to user preferences/criteria when determining the level of specificity, such as a projected interest of the user. The device can calculate a confidence ranking of whether or not the user's interest in the topic is significant enough to desire a detailed description of the photo/image. Additionally or alternatively user familiarity with the image or other digital content—for example, if the image being described is a logo or brand that has been described to the user previously—could inform that the device use a lesser specificity in describing the image.

Accordingly, digital content to be presented on a device to a user is obtained. The digital content includes an image, of which a description is to be provided to the user, and text. Text may be analyzed by a screen reader and read out to a user as explained above. Consider, for instance, FIG. 1 which depicts an example digital image, included in digital content, and of which a description is to be provided to a user. Image 100 depicts a person 102 playing outside on a lawn with a soccer ball 104.

Assume natural language understanding (NLU) description outputs of the image, i.e. image descriptions using natural language, produce two outputs of differing specificity:

Less Specific: "The person plays with the ball outside."

More Specific: "The person plays outside with a red soccer ball on the grass"

In some examples, software can be prompted to generate such descriptions with differing levels of specificity.

A candidate output sentence can be compared to other sentences within the text of the digital content using any desired comparison approach, for instance soft cosine similarity and ontology mapping, for an indication of the similarity between a proposed/candidate image description and the surrounding text. By way of specific example, N-grams (speech corpus) and/or syntactic n-grams (string of speech corpus) are analyzed using a soft cosine function to determine similarity. Soft cosine can be represented as:

$$\text{soft}_{cosine_1}(a, b) = \frac{\sum_{i,j}^{N} s_{i,j} a_i b_j}{\sqrt{\sum_{i,j}^{N} s_{ij} a_i a_j} \sqrt{\sum_{i,j}^{N} s_{ij} b_i b_j}}$$

where $s_{ij}$=similarity (feature$_i$, feature$_j$).

The system and function can consider semantic relationships, as words like "play" and "game" are different words but are related semantically. An ontology map can be used to bridge correlations between words between different ontologies. Thus, the system can detect words and segments within the text with and identify similarity to the NLU image description.

A candidate description of the digital image can be obtained and compared with text of the digital content to obtain a collection of similarity measures between the candidate description and the text of the digital content. An analysis of the digital content to understand the context under which the description of the digital image is to be provided to the user can include determining whether any one or more similarity measures of the collection of similarity measures exceed a user-specific threshold specificity level. In one example, if the system determines that the image is specifically described already within the text due to the high correlation between an NLU description and the existing text of the content, and so the defined threshold is exceeded, a less-specific description ("The person plays outside with the ball") may be utilized.

In some examples, the candidate description serves as a starting point, in that it is a description using a specificity level that the user is expected to want from the digital content. Based on similarity scores, this candidate may be modified or another candidate of differing specificity generated, for instance to describe the image in less specific terms in cases where the text is already sufficiently specific about the image.

Figure 2A:
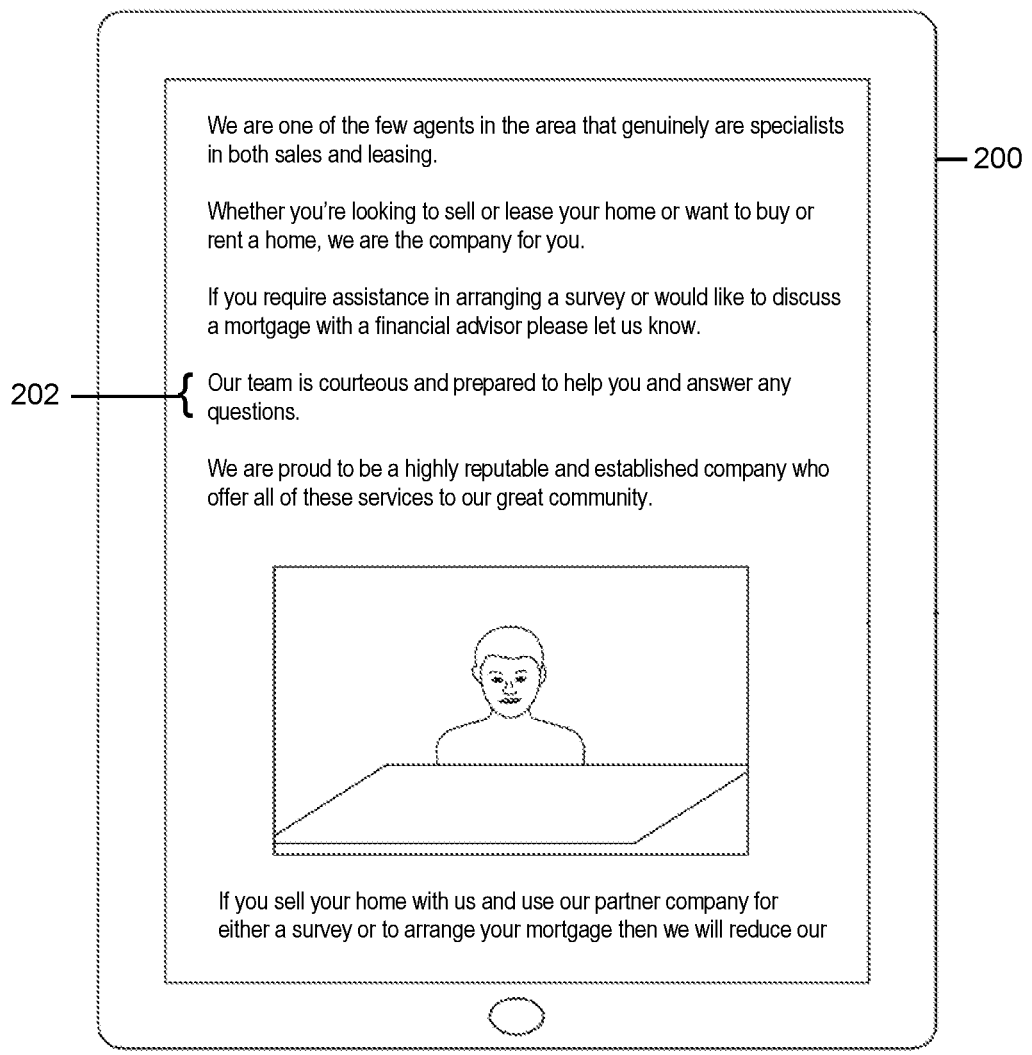
FIGS. 2A and 2B depict a computing device displaying digital content that includes text and a digital image to be described to a user by a screen reader application.
Figure 2B:
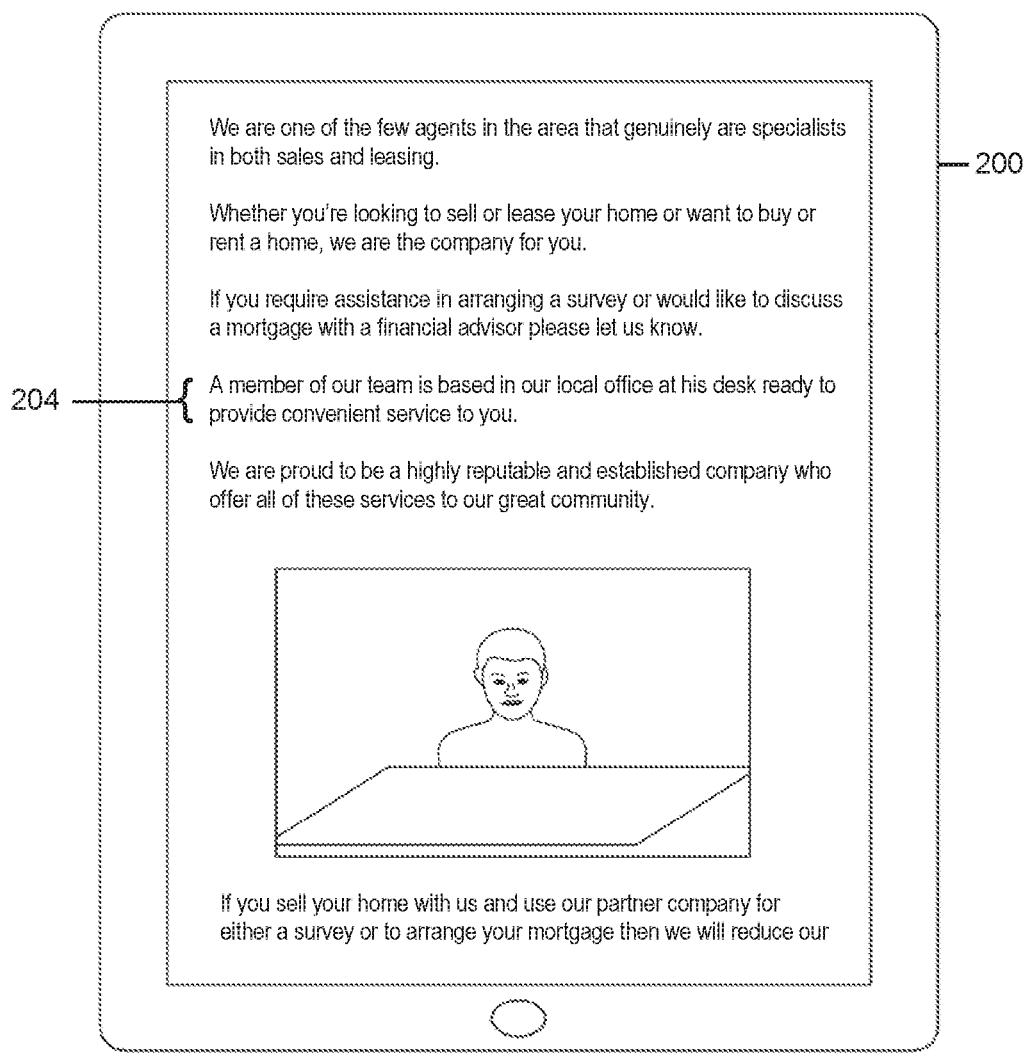

To further illustrate concepts described herein, FIGS. 2A and 2B depict a computing device 200 displaying digital content that includes text and a digital image to be described to a user by a screen reader application. The text portions surrounding the image constitute the text of the digital content. Portions 202 (FIG. 2A) and 204 (FIG. 2B) are text portions that describe the image included in the content. The text differs as between FIG. 2A and FIG. 2B only in that portion 202 (FIG. 2A) is less specific than portion 204.

A candidate description (e.g. a NLU generated description) for the image may be 'An agent on our team based in the Portland office near you is at his desk read to provide the quality and convenient service to you.' This candidate description is in some examples expressed at a level of specificity that the user would expect or desire.

Similarity between the candidate and the other text of the content may be calculated. For instance, a similarity score between the candidate and each sentence may be determined. Assume that the similarity score between the candidate and portion 202 of FIG. 2A is 0.38, and the similarity score between the candidate and portion 204 of FIG. 2B is 0.88, and that these represent the sentences with the highest degree of similarity with the candidate. Assume further that the user threshold of similarity is set at 0.74, where similarity of 0.74 or greater dictates that the image description can be less specific on account of existing text already providing the desired level of specificity, while similarity of less than 0.74 dictates that a more specific description is used. Based on the example similarities and threshold, a more specific description may be used in the example of FIG. 2A when describing the image (for instance the candidate description itself or maybe something even more specific), while a less specific description of the image, or perhaps no description at all, may be used in the situation of FIG. 2B.

Accordingly, based on no (or some threshold number of) similarity measures not exceeding the user-specific threshold specificity level, the level of specificity for describing the digital image can be determined to be the same (or perhaps greater) than a level of specificity of the candidate description, in which case presenting the digital content to the user provides the description of the digital image with the same or a greater specificity than the candidate description. In some situations, providing a description more specific than the candidate might be useful if it is found, after evaluating similarity, that the text of the digital content is so non-specific about the image that providing a greater level of specificity may provide a better context for the overall description of the digital content.

Alternatively, based on one or more similarity measures exceeding the user-specific threshold specificity level, the level of specificity for describing the digital image can be determine to be lower than a level of specificity of the candidate description, in which case presenting the digital content to the user provides the description of the digital image to be less specific than the candidate description and/or provides no description of the image additional to what is already provided by the text.

Figure 3:
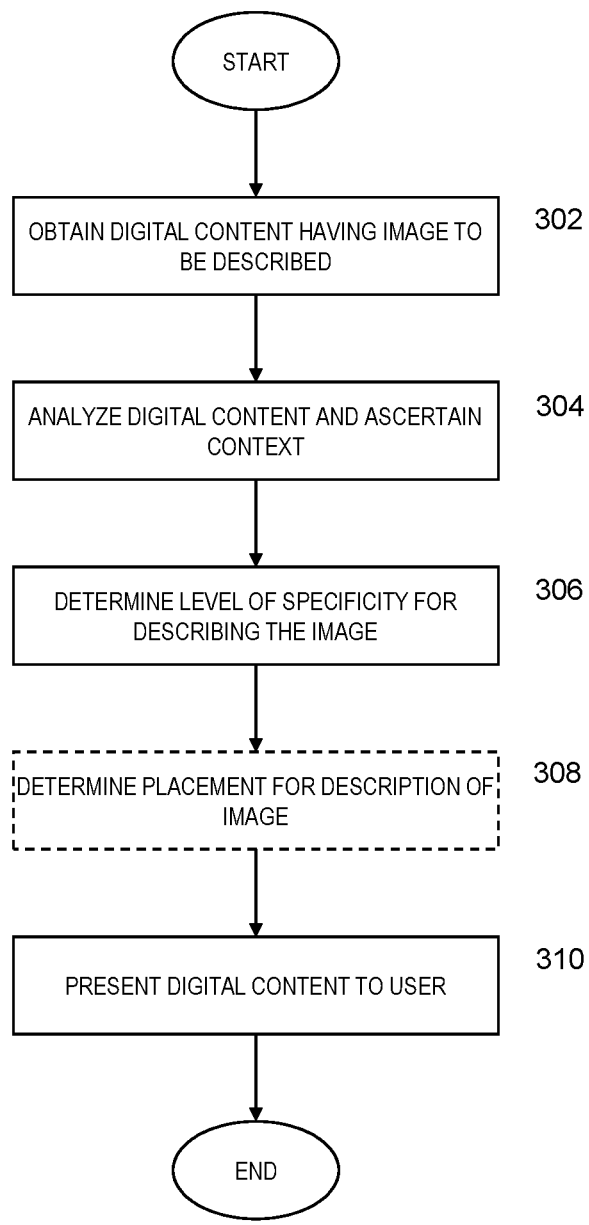
FIG. 3 depicts an example process for image description specificity determination, in accordance with aspects described herein.

FIG. 3 depicts an example process for image description specificity determination, in accordance with aspects described herein. In some examples, the process is performed by one or more computer systems, such as those described herein, which may include one or more computer systems having a screen reader application installed thereon for presenting digital content to a user. Additionally or alternatively, aspects may be performed by one or more cloud servers offering aspects described herein as a service, either for client screen readers installed on end user device, or to provide an audio stream to a user device for playback, as examples.

The process begins by obtaining digital content (302). The digital content is to be presented on a device to a user, and includes a digital image, of which a description is to be provided to the user, and text. Examples of digital content include web pages and documents, though digital content could be anything that may be presented using an application that reads/describes what is shown on a display device. The process continues by analyzing the digital content and ascertaining a context under which the description of the digital image is to be provided to the user (304). The analyzing can include any desired processing to determine how specific to describe the image.

For instance, the analyzing can analyze the user's interest in topics of the digital content, and the context includes a level of the user's interest in the topics of the digital content. Additionally or alternatively, the analyzing analyzes the user's familiarity with topics of the digital content, and the context includes a level of the user's familiarity with the topics of the digital content. Additionally or alternatively, the analyzing analyzes an extent to which the image conveys information additional to what is provided by text of the digital content, as a determination of added value of the image.

Continuing with FIG. 3, the process determines, based at least in part on the context, a level of specificity for describing the digital image to the user (306). As an optional aspect, the process determines placement for the description of the digital image in the audio description of the digital content (308). The determination of the placement is in some examples based on similarities of the description of the digital image to other portions of the digital content. The placement, in the audio description, of the description of the digital image relative to presentation of the other portions can therefore differ from a position of the digital image relative to the other portions in the obtained digital content.

The process of FIG. 3 continues by presenting the digital content, including the digital image, to the user in accordance with the determined level of specificity for describing the digital image (310). It is noted that presentation of the digital image can omit an audio description of the digital image, in which case presentation includes graphically presenting it on the user's display but providing no accompanying audio description. The presenting of the digital content can include the user device automatically reading, as part of an audio description of the digital content, at least some of the text of the digital content as well as the description of the digital image.

Based on the level of specificity of the description of the digital image being as specific or more specific than a portion of text of the digital content, the presenting the digital content can include, in lieu of reading the portion of text, reading a modified version of the portion of text, the modified version of the portion of text being less specific than the portion of text. Thus, if the description of the image is relatively specific, the process might intentionally read a text portion to be less specific than it is written in the document. In one example, the image description can be very specific. A sentence equally as specific in the text might be modified to be less specific. As another example, even if a sentence in the text is less specific than the image description, but still relatively specific such that it consumes too much in terms of time or other resource, the text may be shortened or made less specific when read by the screen reader. This concept can work the other way as well; if the text is relatively descriptive, the description of the image might be omitted altogether, or the image may be described more generally since details are provided in the text.

In some cases, the determined level of specificity indicates that no audio description of the digital image is to be provided in presenting the digital content, and presenting the digital content therefore presents the digital content without describing the digital image.

In particular examples, processing includes obtaining a candidate description of the digital image, and comparing that candidate description with text of the digital content to obtain a collection of similarity measures between the candidate description and the text of the digital content. The analyzing (304) can include determining whether any one or more similarity measures of the collection of similarity measures exceed a user-specific threshold specificity level. Based on the one or more the similarity measures exceeding the user-specific threshold specificity level, determining the level of specificity for describing the digital image determines the level of specificity to be lower than a level of specificity of the candidate description. If the text itself already provides details of the image at a level the user would desire, the level of specificity with which to actually describe the image can be made relatively low. Presenting the digital content to the user in that instance can include providing the description of the digital image to be less specific than the candidate description, or providing no description of the image apart from the text.

If, instead, the one or more of the similarity measures do not exceed the user-specific threshold specificity level, determining the level of specificity for describing the digital image can determine the level of specificity to be the same or greater than a level of specificity of the candidate description, where presenting the digital content to the user provides the description of the digital image with the same or a greater specificity than the candidate description. In this instance, the text itself fails to provide details of the image at a level (represented by the candidate description) that the user desires. Therefore, the image can in these instances be described using the candidate description or something more specific than the candidate description.

Although various examples are provided, variations are possible without departing from a spirit of the claimed aspects.

Figure 4:
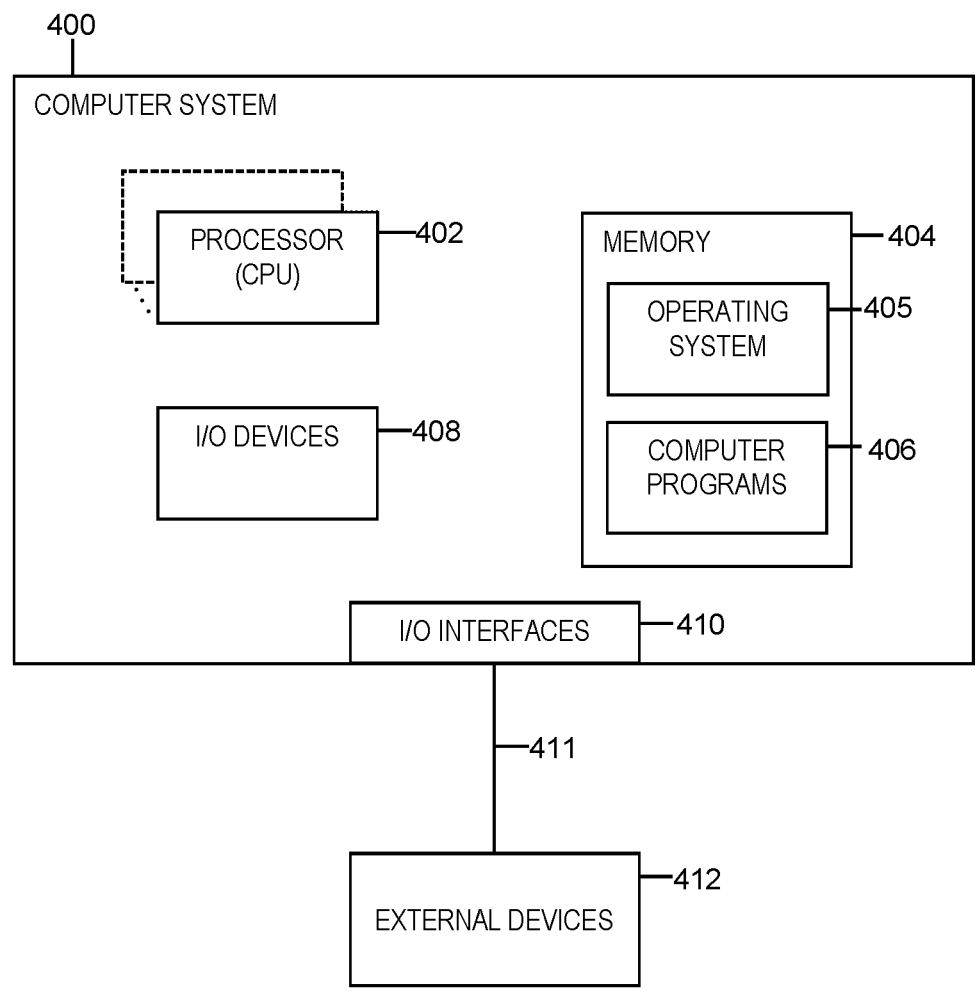
FIG. 4 depicts one example of a computer system and associated devices to incorporate and/or use aspects described herein.

Processes described herein may be performed singly or collectively by one or more computer systems, such as those having a screen reader application and/or one or more computer systems in communication with a screen reader application, as examples. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive (s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
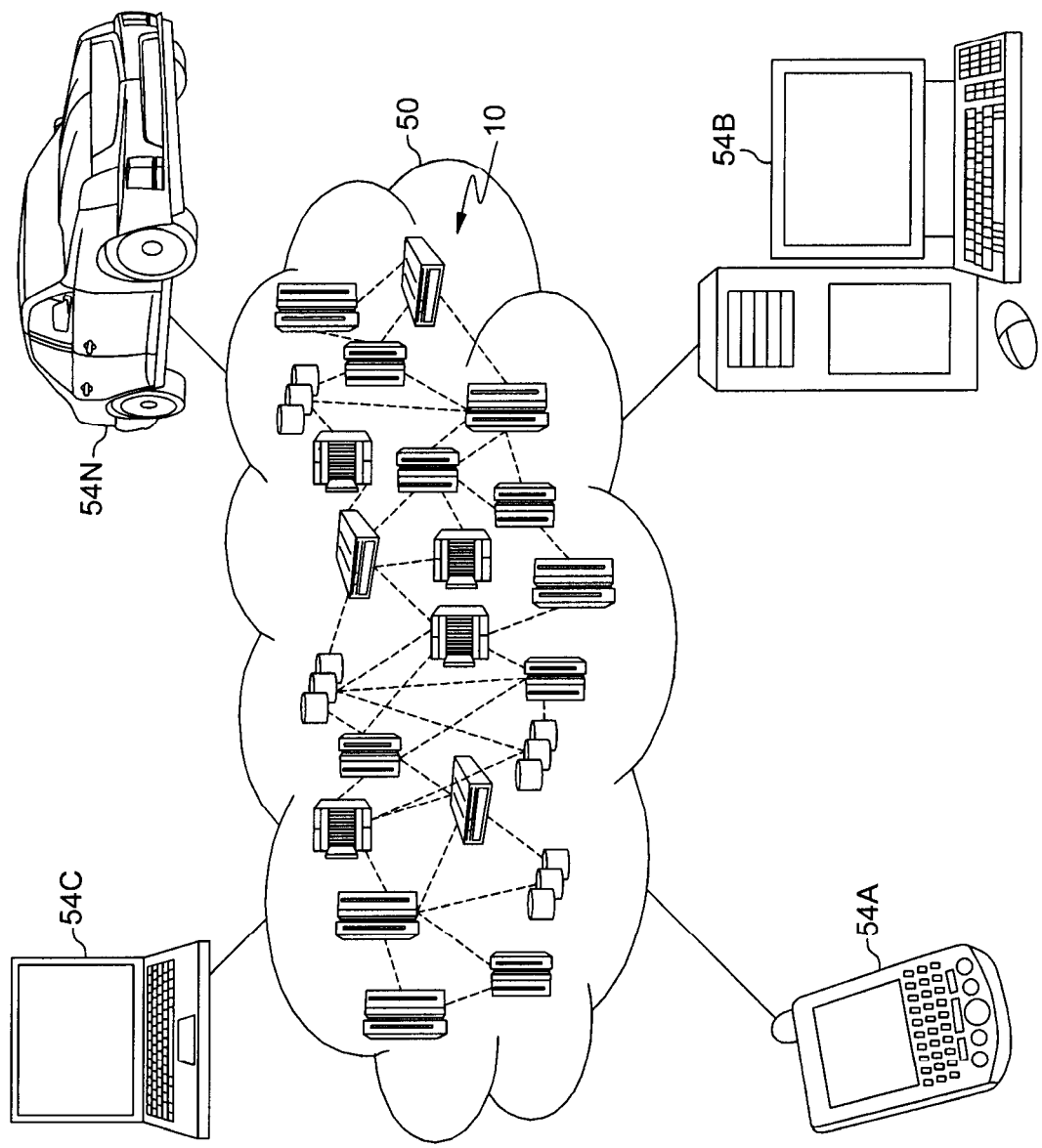
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
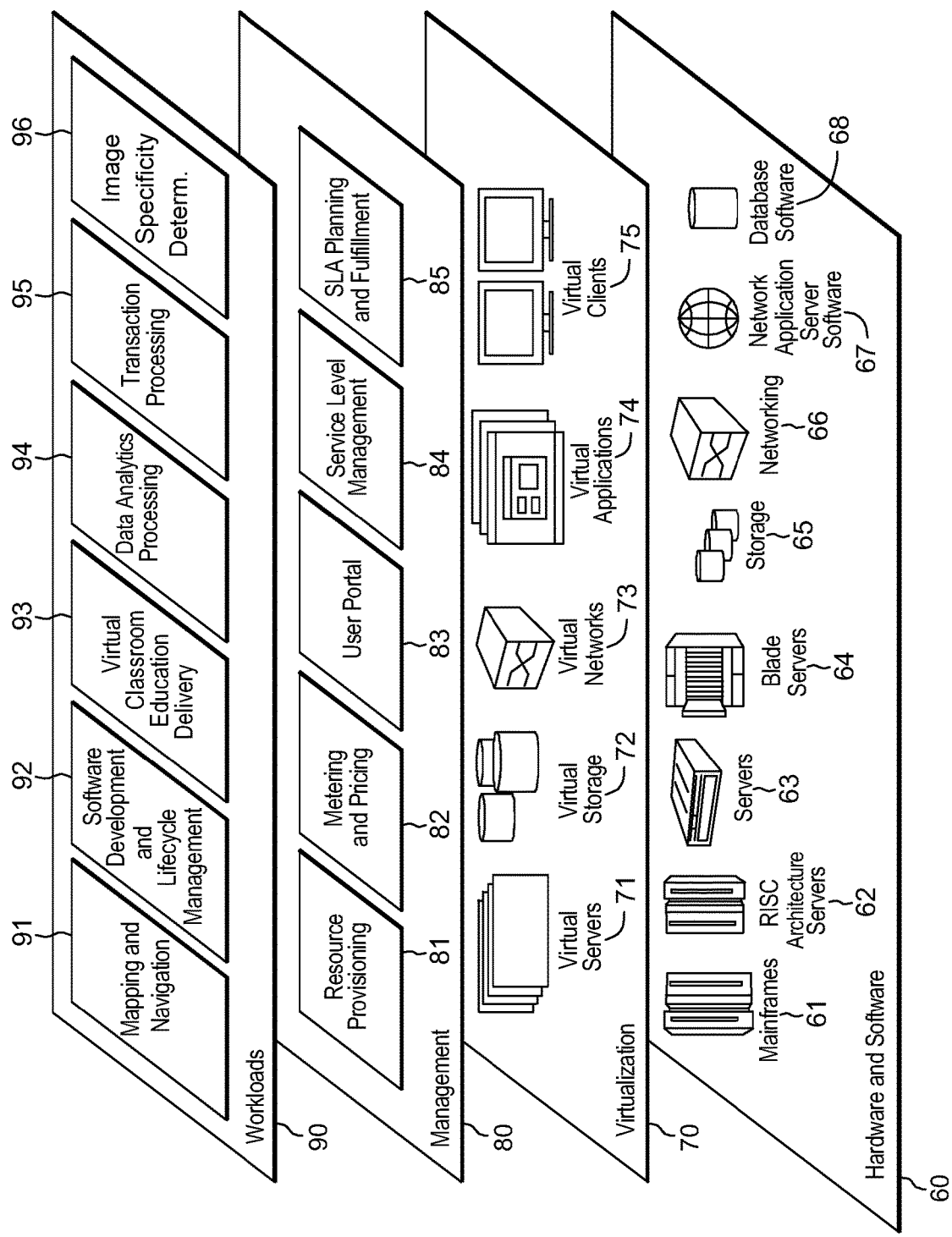
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image description specificity determination 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining digital content to be presented on a device to a user, the digital content comprising a digital image, of which a description is to be provided to the user, and text;
analyzing the digital content and ascertaining a context under which the description of the digital image is to be provided to the user;
determining, based at least in part on the context, a level of specificity for describing the digital image to the user; and
presenting the digital content, including the digital image, to the user in accordance with the determined level of specificity for describing the digital image, wherein based on the level of specificity of the description of the digital image being as specific or more specific than a portion of text of the digital content, the presenting the digital content includes, in lieu of reading the portion of text, reading a modified version of the portion of text, the modified version of the portion of text being less specific than the portion of text.

2. The method of claim 1, wherein the presenting the digital content comprises the user device automatically reading, as part of an audio description of the digital content, at least some of the text of the digital content and the description of the digital image.

3. The method of claim 2, further comprising determining placement for the description of the digital image in the audio description, wherein the determining the placement is based on similarities of the description of the digital image to other portions of the digital content, and wherein the placement, in the audio description, of the description of the digital image relative to presentation of the other portions differs from a position of the digital image relative to the other portions in the obtained digital content.

4. The method of claim 1, wherein the analyzing further analyzes the user's interest in topics of the digital content, and the context comprises a level of the user's interest in the topics of the digital content.

5. The method of claim 1, wherein the analyzing further analyzes the user's familiarity with topics of the digital content, and the context comprises a level of the user's familiarity with the topics of the digital content.

6. The method of claim 1, wherein the analyzing further analyzes an extent to which the image conveys information additional to what is provided by text of the digital content.

7. The method of claim 1, further comprising:
obtaining a candidate description of the digital image; and
comparing the candidate description with text of the digital content to obtain a collection of similarity measures between the candidate description and the text of the digital content;
wherein the analyzing comprises determining whether any one or more similarity measures of the collection of similarity measures exceed a user-specified threshold.

8. The method of claim 7, wherein based on the one or more similarity measures exceeding the user-specified threshold, the determining the level of specificity for describing the digital image determines the level of specificity to be lower than a level of specificity of the candidate description.

9. The method of claim 8, wherein the presenting the digital content to the user comprises providing the description of the digital image to be less specific than the candidate description.

10. The method of claim 7, wherein based on the one or more similarity measures not exceeding the user-specified threshold, the determining the level of specificity for describing the digital image determines the level of specificity to be the same or greater than a level of specificity of the candidate description, and wherein the presenting the digital content to the user provides the description of the digital image with the same or a greater specificity than the candidate description.

11. A computer program product comprising:
a computer readable storage medium readable by a processing circuit and storing instructions for execution by the processing circuit for performing a method comprising:
obtaining digital content to be presented on a device to a user, the digital content comprising a digital image, of which a description is to be provided to the user, and text;
analyzing the digital content and ascertaining a context under which the description of the digital image is to be provided to the user;
determining, based at least in part on the context, a level of specificity for describing the digital image to the user; and
presenting the digital content, including the digital image, to the user in accordance with the determined level of specificity for describing the digital image, wherein, based on the level of specificity of the description of the digital image being as specific or more specific than a portion of text of the digital content, the presenting the digital content includes, in lieu of reading the portion of text, reading a modified version of the portion of text, the modified version of the portion of text being less specific than the portion of text.

12. The computer program product of claim 11, wherein the presenting the digital content comprises the user device automatically reading, as part of an audio description of the digital content, at least some of the text of the digital content and the description of the digital image, and wherein the method further comprises determining placement for the description of the digital image in the audio description, wherein the determining the placement is based on similarities of the description of the digital image to other portions of the digital content, and wherein the placement, in the audio description, of the description of the digital image relative to presentation of the other portions differs from a position of the digital image relative to the other portions in the obtained digital content.

13. The computer program product of claim 11, wherein the method further comprises:
obtaining a candidate description of the digital image; and
comparing the candidate description with text of the digital content to obtain a collection of similarity measures between the candidate description and the text of the digital content;
wherein the analyzing comprises determining whether any one or more similarity measures of the collection of similarity measures exceed a user-specified threshold.

14. The computer program product of claim 13, wherein based on the one or more similarity measures exceeding the user-specified threshold, the determining the level of specificity for describing the digital image determines the level of specificity to be lower than a level of specificity of the candidate description.

15. The computer program product of claim 13, wherein based on the one or more similarity measures not exceeding the user-specified threshold, the determining the level of specificity for describing the digital image determines the level of specificity to be the same or greater than a level of specificity of the candidate description, and wherein the presenting the digital content to the user provides the description of the digital image with the same or a greater specificity than the candidate description.

16. A computer system comprising:
a memory; and
a processor in communication with the memory, wherein the computer system is configured to perform a method comprising:
obtaining digital content to be presented on a device to a user, the digital content comprising a digital image, of which a description is to be provided to the user, and text;
analyzing the digital content and ascertaining a context under which the description of the digital image is to be provided to the user;
determining, based at least in part on the context, a level of specificity for describing the digital image to the user; and
presenting the digital content, including the digital image, to the user in accordance with the determined level of specificity for describing the digital image, wherein, based on the level of specificity of the description of the digital image being as specific or more specific than a portion of text of the digital content, the presenting the digital content includes, in lieu of reading the portion of text, reading a modified version of the portion of text, the modified version of the portion of text being less specific than the portion of text.

17. The computer system of claim 16, wherein the method further comprises:
obtaining a candidate description of the digital image; and
comparing the candidate description with text of the digital content to obtain a collection of similarity measures between the candidate description and the text of the digital content;
wherein the analyzing comprises determining whether any one or more similarity measures of the collection of similarity measures exceed a user-specified threshold, and wherein the determining the level of specificity for describing the digital image comprises one selected from the group consisting of:

based on the one or more similarity measures exceeding the user-specified threshold, determining the level of specificity to be lower than a level of specificity of the candidate description; and based on the one or more similarity measures not exceeding the user-specified threshold, determining the level of specificity to be the same or greater than a level of specificity of the candidate description, wherein the presenting the digital content to the user provides the description of the digital image with the same or a greater specificity than the candidate description.

* * * * *